Sept. 17, 1935.  C. A. COOK  2,014,835

TRANSMISSION

Filed Aug. 6, 1934  2 Sheets-Sheet 1

INVENTOR.
Charles A. Cook
BY Chappell & Earl
ATTORNEYS

Sept. 17, 1935.  C. A. COOK  2,014,835

TRANSMISSION

Filed Aug. 6, 1934  2 Sheets-Sheet 2

INVENTOR.
Charles A. Cook
BY Chappell & Earl
ATTORNEYS

Patented Sept. 17, 1935

2,014,835

UNITED STATES PATENT OFFICE 2,014,835

TRANSMISSION

Charles A. Cook, Kalamazoo, Mich., assignor to Fuller Manufacturing Company, Kalamazoo, Mich.

Application August 6, 1934, Serial No. 738,634

14 Claims. (Cl. 308—135)

The main objects of this invention are:

First, to provide an improved transmission which is especially designed for heavy duty work such as that required by automotive vehicles, trucks, and the like.

Second, to provide improved means in a transmission of this character for holding gears in assembled relation with the drive shaft of the transmission.

Objects relating to details and economies of my invention will appear from the description to follow. The invention is defined and pointed out in the claims.

Structures which are preferred embodiments of my invention are illustrated in the accompanying drawings, in which.

Figure 1:
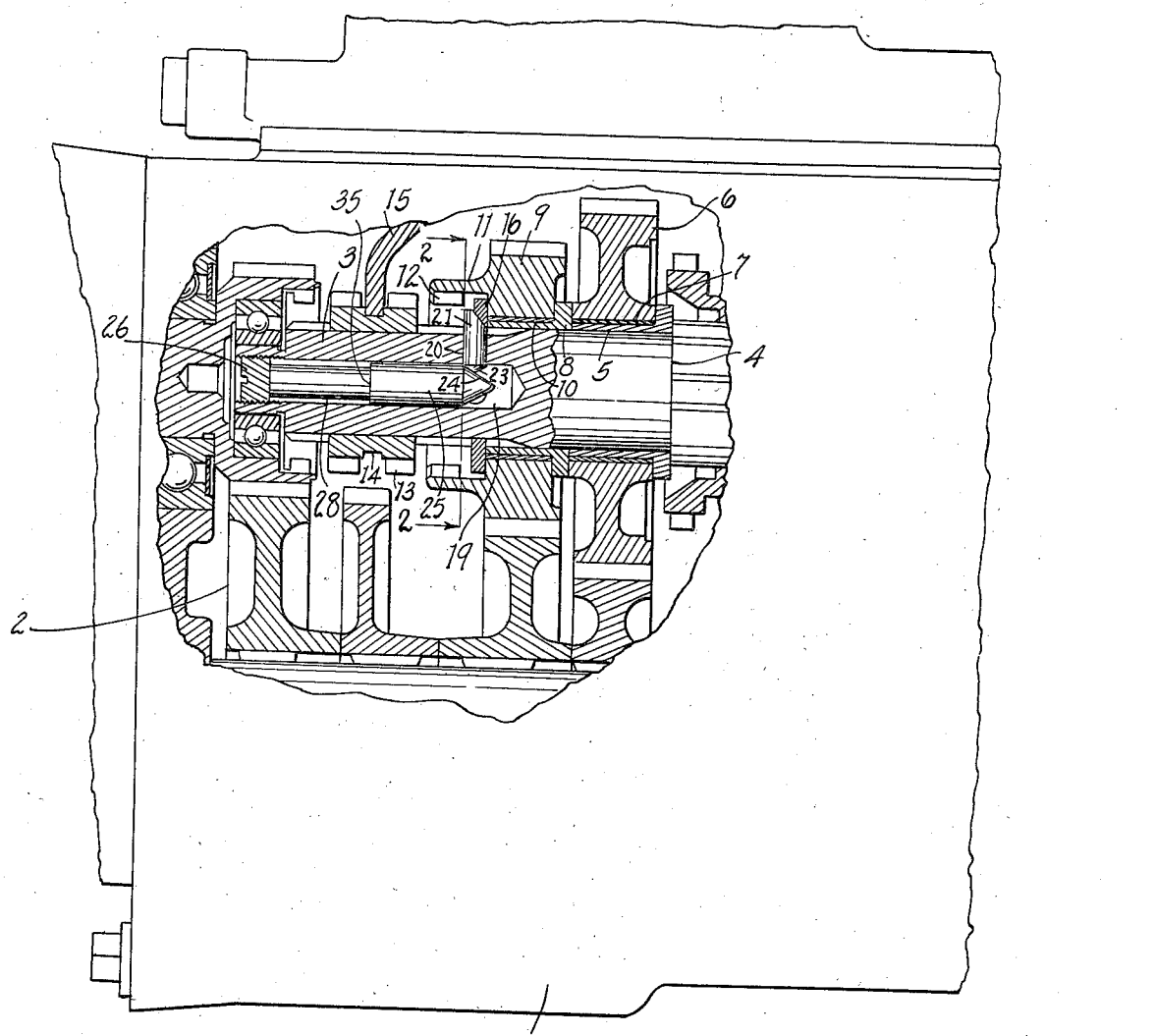
Fig. 1 is a fragmentary view in side elevation of a transmission gear box, a portion of the box being broken away to show parts of the transmission in vertical longitudinal section on a line corresponding to line 1—1 of Figs. 2 and 3.
Figure 3:
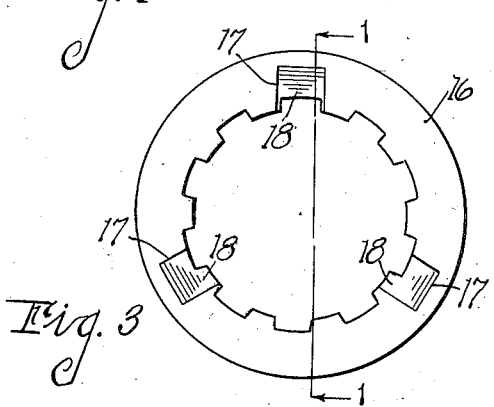
Fig. 3 is a view in front elevation of the retaining ring.
Figure 4:
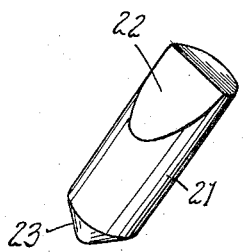
Fig. 4 is an enlarged perspective view of one of the key pins for retaining the ring.
Figure 2:
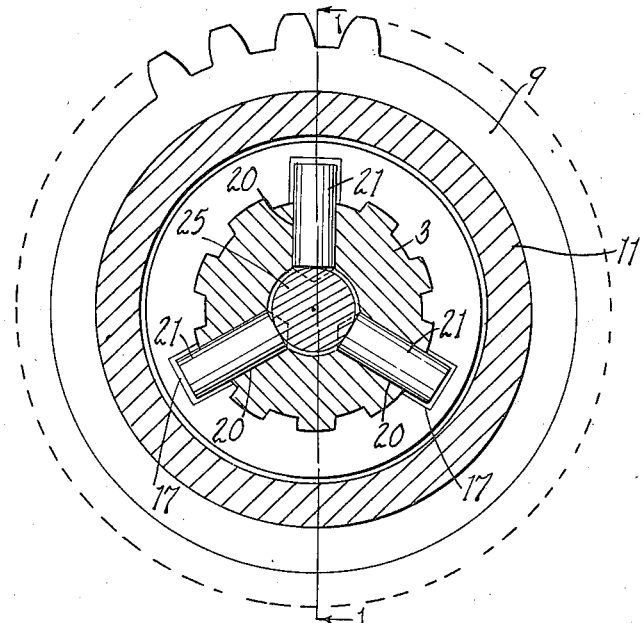
Fig. 2 is an enlarged fragmentary transverse section taken on a line corresponding to line 2—2 of Fig. 1.

Referring to the drawings, 1 is a gear box within which the transmission 2 is housed. Aside from my improvement, which will be described in detail below, the transmission 2 is of conventional design and is therefore so well known to the art that it requires no detailed description here. The drive shaft 3 is provided with an annular shoulder 4 against which abuts the inner end of the sleeve 5 on which is rotatably mounted the gear 6, a bushing 7 constituting a bearing being disposed between the gear and sleeve.

Similarly, the inner end of the sleeve 8 abuts the outer ends of sleeve 5, bushing 7 and gear 6, the gear wheel 9 being rotatably disposed on the sleeve 8 with the bushing 10 arranged therebetween. The gear wheel 9 has an annular flange 11 provided with internal clutch teeth 12 with which the teeth 13 of the sliding clutch 14 are adapted to mesh when the sliding clutch is moved longitudinally of the shaft, the sliding clutch being splined to the shaft for longitudinal movement. A portion of the shift lever is indicated at 15. All of the parts so far described are of known construction and at this point my invention departs from the prior art.

Heretofore, the gear wheel 9 and the parts associated therewith have been held in place on the drive shaft 3 adjacent the shoulder 4 by means of a gear retaining ring which was splined to the drive shaft, the ring itself being held in place by means of an annular split key or split ring engaging an annular groove in the shaft and the outer side of the ring. A great deal of trouble has been experienced in repairing the parts when, as sometimes happened, the annular key was sheared or broken by the outward movement of the gear wheel 9 relative to the drive shaft 3. Owing to the fact that the gear retaining means was within the flange 11 of the gear wheel 9, practically the whole transmission assembly had to be taken apart to repair the transmission in case something happened to the gear retaining means. Further, very serious damage to the transmission sometimes results from the locking ring or key being broken so that the parts can slip out. The main purpose of my invention is to provide improved retaining means for holding the gear assembly 6 and 9 in place on the drive shaft 3 adjacent the annular shoulder 4.

To this end, I provide a ring 16 splined to the drive shaft 3 adjacent the gear wheel 9 within the flange 11, the ring having internal radial grooves or pin seats 17, the bottoms 18 of which are inclined outwardly and rearwardly as shown. The inner face of the ring 16 is adapted to abut the outer ends of the sleeve 8, bushing 10 and gear wheel 9. I further provide the drive shaft 3 with a central longitudinal bore 19 and radial holes 20 opening to the ring 16 under the grooves 17.

Within the holes 20, I dispose the ring retaining key pins 21 for radial movement, the key pins having beveled faces 22 coacting with the inclined bottoms 18 of the grooves 17. The inner ends of the key pins 21 are tapered at 23 for coaction with the tapered inner end 24 of the bolt 25 slidably disposed within the bore 19.

Within the outer end of the bore 19, I thread a closure screw 26 to abut the outer end of the bolt 25 for forcing the latter inwardly to expand the key pins 21 radially and tighten the parts between the beveled faces 22 of the key pins and the shoulder 4 of the drive shaft. With this arrangement, the parts of the gear retaining means are easy to install, adjust and repair. The relatively stout key pins 21 hold the sleeves and their gears in proper position on the drive shaft and resist shear to a marked degree. The screw 26 is readily available for adjusting the contact between the parts, taking up any inaccuracies in manufacture and wear.

The diameter of the bolt is preferably such that the bolt may have a limited lateral floating movement so that it may adjust to uniformly seat all the pins.

Figure 5:
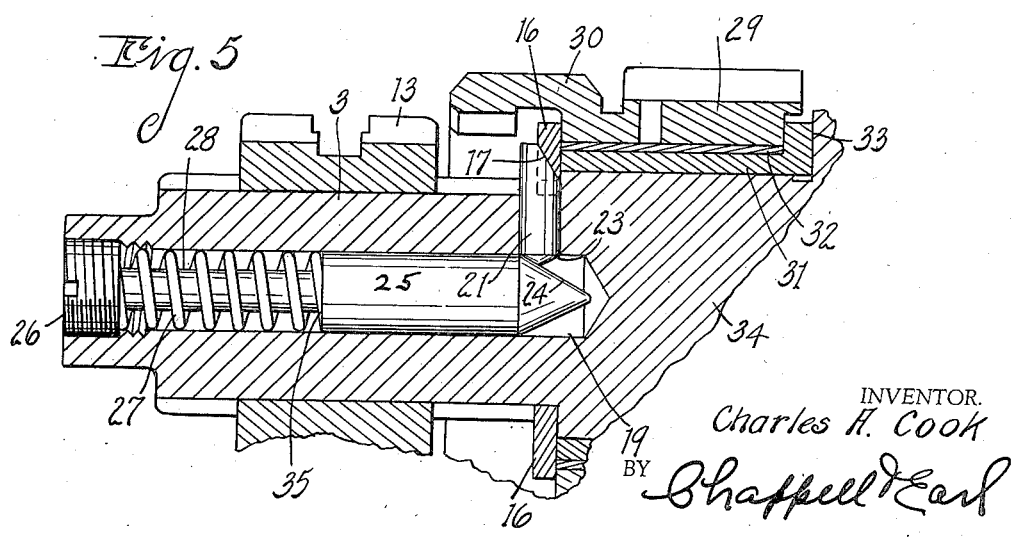
Fig. 5 is an enlarged fragmentary view in longitudinal vertical section of a modification.

As shown by Fig. 5, a coiled compression spring 27 may be arranged on the outer end portion 28 of reduced cross section and between the screw 26 and shoulder 35 for urging the bolt inwardly to automatically take up any lost motion caused by wear between the parts. Otherwise, the details of the construction of the modification are similar to those described above in connection with Figs. 1 to 4, with the exception that the gear 29 and the gear wheel 30 are rotatable on the single sleeve 31, a single bushing 32 being disposed between the sleeve and gears. Thus, the ring 16 acts to hold the parts in assembled relation with respect to the shoulder 33 on the drive shaft 34.

It will be appreciated by those skilled in the art that I have provided a very decided improvement in retaining the gear wheel and its bearing in proper position relative to the drive shaft, such means not only being simple and economical in its parts, but very efficient and effective for the purpose intended. My gear retaining means is not only stronger and more efficient than those used in the past, but it is much easier to repair or replace in case of accidental damage. The structure may be quickly disassembled on the road if that becomes necessary or desirable without the use of special tools as is necessary in the old type I have described.

The ring 16 is preferably splined or keyed to the shaft, but quite a satisfactory structure results where the ring is not splined or keyed to the shaft. In certain cases, the ring might rotate without serious objection and in other cases the rotative stresses could be effectively sustained by the pins. The splines are, however, desirable where the structure is likely to be subject to heavy loads or stresses.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I claim as new and desire to secure by Letters Patent, is:

1. In a transmission, the combination with a shaft provided with annular stop means, and a gear wheel rotatably mounted on said shaft adjacent said stop means and having opposite said means an annular flange provided with internal clutch teeth, of means acting to hold said gear wheel in place on said shaft, comprising a ring splined to said shaft adjacent said gear wheel within said flange and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, the inner ends of the key pins being tapered, a bolt slidably disposed within said bore and having a tapered inner end engaging the inner ends of the key pins, the outer end portion of the bolt being of reduced cross section, a closure screw threaded in the outer end of said bore and abutting the outer end of said bolt for forcing the same inwardly, and a coiled compression spring surrounding the outer end portion of said bolt for urging the latter inwardly to take up lost motion caused by wear between the parts.

2. In a transmission, the combination with a shaft provided with annular stop means, and a gear wheel rotatably mounted on said shaft adjacent said stop means and having opposite said means an annular flange provided with internal clutch teeth, of means acting to hold said gear wheel in place on said shaft, comprising a ring splined to said shaft adjacent said gear wheel within said flange and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, and means disposed in said bore for expanding said key pins relative to said shaft.

3. In a transmission, the combination with a shaft provided with annular stop means, and a gear wheel rotatably mounted on said shaft adjacent said stop means and having opposite said means an annular flange, of means acting to hold said gear wheel in place on said shaft, comprising a ring splined to said shaft adjacent said gear wheel within said flange and having internal radial grooves, the bottoms of which are inclined outwardly and rearwardly, the shaft having a central longitudinal bore and radial holes opening to the ring under said grooves, and ring retaining key pins disposed in said holes for radial movement and having beveled faces coacting with the inclined bottoms of said grooves.

4. In a transmission, the combination of a shaft, a gear wheel on said shaft, and means acting to hold said gear wheel against axial movement on said shaft, said means comprising a ring splined to said shaft and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, the inner ends of the key pins being tapered, a bolt slidably disposed within said bore and having a tapered inner end engaging the inner ends of the key pins, the outer end portion of the bolt being of reduced cross section, means threaded in the outer end of said bore and abutting the outer end of said bolt for forcing the same inwardly, and a coiled compression spring surrounding the outer end portion of said bolt for urging the latter inwardly to take up lost motion caused by wear between the parts.

5. In a transmission, the combination of a shaft a gear wheel on said shaft, and means acting to hold said gear wheel against axial movement on said shaft, said means comprising a ring splined to said shaft and having internal radial grooves, the bottoms of which are inclined outwardly and rearwardly, the shaft having a central longitudinal bore and radial holes opening to the ring under said grooves. ring retaining key pins disposed in said holes for radial movement and having beveled faces coacting with the inclined bottoms of said grooves, and manually controllable means in said bore for expanding said pins.

6. In a transmission, the combination of a shaft, a gear wheel on said shaft, and means acting to hold said gear wheel against axial movement on said shaft, said means comprising a ring splined to said shaft and in supporting relation to the gear, the shaft having a central longitudinal bore and radial holes opening to the ring, ring retaining key pins disposed in said holes for radial movement and having beveled faces coacting with the side of the ring remote from the gear, a bolt slidably disposed within said bore and having a tapered inner end engaging the inner ends of the key pins, and means in the outer end of said bore abutting the outer end of said bolt.

7. In a transmission, the combination with a shaft provided with an annular shoulder, a sleeve on said shaft having an annular flange abutting said shoulder, a gear wheel rotatably mounted on said sleeve and having opposite said shoulder an annular flange provided with an internal clutch member, of means acting to hold said gear wheel and sleeve in place on said shaft comprising a ring splined to said shaft adjacent said gear wheel within said flange thereof and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, the inner ends of the key pins being tapered, a bolt slidably disposed within said bore and having a tapered inner end engaging the inner ends of the key pins, the outer end portion of the bolt being of reduced cross section, closure means in the outer end of said bore abutting the outer end of said bolt, and a coiled compression spring surrounding the outer end portion of said bolt for urging the latter inwardly to take up lost motion caused by wear between the parts.

8. In a transmission, the combination with a shaft provided with an annular shoulder, a sleeve on said shaft having an annular flange abutting said shoulder, a gear wheel rotatably mounted on said sleeve and having opposite said shoulder an annular flange provided with an internal clutch member, of means acting to hold said gear wheel and sleeve in place on said shaft, comprising a ring splined to said shaft adjacent said gear wheel within said flange thereof and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, a bolt slidably disposed within said bore and having a tapered inner end engaging the inner ends of the key pins, the outer end portion of the bolt being of reduced cross section, closure means in the outer end of said bore abutting the outer end of said bolt, and a spring urging said bolt.

9. In a transmission, the combination with a shaft provided with an annular shoulder, a sleeve on said shaft having an annular flange abutting said shoulder, a gear wheel rotatably mounted on said sleeve and having opposite said shoulder an annular flange provided with an internal clutch member, of means acting to hold said gear wheel and sleeve in place on said shaft, comprising a ring arranged on said shaft adjacent said gear wheel within said flange thereof and having internal radial grooves, the bottoms of which are inclined outwardly and rearwardly, the shaft having a central longitudinal bore and radial holes opening to the ring under said grooves, ring retaining key pins disposed in said holes for radial movement and having beveled faces coacting with the inclined bottoms of said grooves, and a bolt disposed within said bore and having a tapered inner end engaging the inner ends of the key pins.

10. In a transmission, the combination of a shaft provided with a longitudinal bore opening at one end, a gear rotatable on said shaft and provided with a flange-like clutch member, a retaining ring disposed within said clutch member, said ring having inclined key seats, said shaft having radial bores opening to said longitudnal bore and with which said key seats may be aligned, key pins arranged in said radial bores and having inclined portions coacting with said key seats of said ring, the inner ends of said key pins being conical, a bolt disposed in said longitudinal bore and having a conical tip portion coacting with the conical inner end of said key pins for projecting the pins, said bolt being of such diameter relative to the diameter of the longitudinal bore of the shaft as to permit limited lateral floating thereof, and a screw means for adjusting said bolt constituting a closure for said longitudinal bore.

11. In a transmission, the combination of a shaft provided with a longitudinal bore, a gear rotatable on said shaft and provided with a flange-like clutch member, a retaining ring disposed within said clutch member, said ring having inclined key seats, said shaft having radial bores opening to said longitudinal bore and with which said key seats may be aligned, key pins arranged in said radial bores and having inclined portions coacting with said key seats of said ring, and means disposed in said longitudinal bore for projecting the pins.

12. In a transmission, the combination of a drive shaft having a longitudinal bore opening at one end, a gear rotatable on said shaft and provided with a flange-like clutch member, a retaining ring disposed within said clutch member in supporting relation to said gear, said shaft having radial bores, key pins arranged in said radial bores so that when projected they engage the side of said ring remote from said gear to adjust and support the same axially, the inner ends of said key pins being conical, a bolt disposed within said longitudinal bore and having a tapered portion coacting with the conical inner ends of said pins for projecting the pins, said bolt being of such diameter relative to the diameter of the longitudinal bore of the shaft as to permit limited lateral floating thereof, and means for adjusting said bolt within said longitudinal bore for projecting said pins.

13. In a transmission, the combination of a drive shaft having a longitudinal bore opening at one end, a gear rotatable on said shaft and provided with a flange-like clutch member, a retaining ring disposed within said clutch member in supporting relation to the gear, said shaft having radial bores, key pins arranged in said radial bores so that when projected they engage the side of the ring remote from the gear and means within said longitudinal bore for projecting said pins.

14. In a transmission, the combination of a shaft provided with a longitudinal bore, a member on said shaft, a retaining ring in axial supporting relation to said member having inclined radial key seats on its side remote from said member, said shaft having radial bores opening to said longitudinal bore and with which said key seats may be aligned, key pins arranged in said radial bores and having inclined portions coacting with said key seats of said ring, a bolt disposed within said longitudinal bore and having a tapered portion coacting with the inner ends of said pins for projecting the pins, said bolt being of such diameter relative to the diameter of the longitudinal bore of the shaft as to permit limited lateral floating thereof, and means for adjusting said bolt.

CHARLES A. COOK.